(12) United States Patent
Kurokawa et al.

(10) Patent No.: US 11,243,539 B2
(45) Date of Patent: Feb. 8, 2022

(54) IMAGING SYSTEM FOR SHIP, SHIP INCLUDING THE SYSTEM, AND CALIBRATING METHOD FOR IMAGING SYSTEM FOR SHIP

(71) Applicants: XACTI CORPORATION, Osaka (JP); YAMAHA HATSUDOKI KABUSHIKI KAISHA, Iwata (JP)

(72) Inventors: Mitsuaki Kurokawa, Osaka (JP); Shimpei Fukumoto, Osaka (JP); Kohei Terada, Shizuoka (JP); Hirofumi Amma, Shizuoka (JP); Yoshimasa Kinoshita, Shizuoka (JP)

(73) Assignees: XACTI CORPORATION, Osaka (JP); YAMAHA HATSUDOKI KABUSHIKI KAISHA, Shizuoka (JP)

( * ) Notice: Subject to any disclaimer, the term of this patent is extended or adjusted under 35 U.S.C. 154(b) by 72 days.

(21) Appl. No.: 16/811,064

(22) Filed: Mar. 6, 2020

(65) Prior Publication Data

US 2020/0293047 A1 Sep. 17, 2020

(30) Foreign Application Priority Data

Mar. 14, 2019 (JP) .............................. JP2019-047546

(51) Int. Cl.
  *G05D 1/02* (2020.01)
  *H04N 5/225* (2006.01)
  *B60R 11/04* (2006.01)
(52) U.S. Cl.
  CPC ......... *G05D 1/0206* (2013.01); *H04N 5/2252* (2013.01); *B60R 11/04* (2013.01)

(58) Field of Classification Search
  None
  See application file for complete search history.

(56) References Cited

U.S. PATENT DOCUMENTS

| 2010/0092042 | A1 | 4/2010 | Asari |
| 2010/0225761 | A1* | 9/2010 | Ishii ..................... G01C 21/203 348/144 |
| 2011/0074916 | A1* | 3/2011 | Demirdjian .......... H04N 5/2254 348/36 |
| 2012/0224063 | A1* | 9/2012 | Terre ................ H04N 5/232945 348/148 |
| 2016/0214534 | A1* | 7/2016 | Richards .............. H04N 13/204 |

FOREIGN PATENT DOCUMENTS

| JP | 2010-093605 A | 4/2010 |
| JP | 2014-183540 A | 9/2014 |
| JP | 2019-186869 A | 10/2019 |

* cited by examiner

*Primary Examiner* — Rebecca A Volentine
(74) *Attorney, Agent, or Firm* — Keating and Bennett, LLP (57) ABSTRACT

An imaging system for a ship includes cameras mounted on the ship and spaced apart at a predetermined interval, and a controller that combines peripheral images of the ship captured by the respective cameras to create a simulated bird's eye image. Adjacent ones of the cameras are located at positions and angles so that the peripheral images include a common portion of the ship. The controller performs a calibration process to adjust areas of the peripheral images to be used for the bird's eye image based on a calibration index located at a portion of the ship and included in the common peripheral images.

8 Claims, 6 Drawing Sheets

IMAGING SYSTEM FOR SHIP, SHIP INCLUDING THE SYSTEM, AND CALIBRATING METHOD FOR IMAGING SYSTEM FOR SHIP

CROSS REFERENCE TO RELATED APPLICATIONS

This application claims the benefit of priority to Japanese Patent Application No. 2019-047546 filed on Mar. 14, 2019. The entire contents of this application are hereby incorporated herein by reference.

BACKGROUND OF THE INVENTION

1. Field of the Invention

The present disclosure relates to an imaging system for a ship, a ship including the system, and a calibrating method for the imaging system for a ship.

2. Description of the Related Art

In order to assist the steering of a ship, combining peripheral images captured by a plurality of cameras placed around the hull to create, as a composite image, a simulated bird's eye image of the ship as if the ship were viewed down from above, and displaying the image on a display device mounted on the ship have been known. A ship steering assistance system (steering assistance device) for displaying such a bird's eye image is disclosed in Japanese Unexamined Patent Publication No. 2010-093605, for example.

To combine the peripheral images captured by a plurality of cameras, there is a need to perform calibration process of the imaging system, which is called "calibration." In the calibration process, the areas, to be used for the bird's eye image, of the peripheral images captured by the adjacent cameras are adjusted in accordance with the state of placement, such as the placement positions or placement angles, of the respective cameras to avoid overlap or loss of the capturing ranges.

Such calibration process of an imaging system is performed by a vehicle driving assistance system that displays a bird's eye image. The calibration process of the imaging system used for a driving system of a vehicle is performed by placing, for example, a plurality of calibration indexes as references for determining the placement of the cameras on a road or a floor surface and capturing common one(s) of the calibration indexes with adjacent ones of the cameras. Such a calibrating method for an imaging system is disclosed in Japanese Unexamined Patent Publication No. 2014-183540, for example.

It is however difficult for an imaging system for a ship on water to place calibration indexes in proper positions, since the calibration indexes floating on the water surface may flow with the movement of the water. To address the problem, the applicant of the present application suggests a calibrating method for an imaging system in which calibration indexes are placed at a moorage and calibration process is performed using the calibration indexes (Japanese Patent Application No. 2018-078794). In the calibrating method for the imaging system, however, the calibration process can be performed only at the moorage, that is, flexibility of the timing of the calibration process is limited.

SUMMARY OF THE INVENTION

Preferred embodiments of the present invention provide imaging systems for ships, each of which combines peripheral images of a ship captured by a plurality of cameras to create a composite image and that performs calibration process to adjust the areas of the peripheral images of the ship to be used for the composite image, wherever the ship is.

A calibration process according to a preferred embodiment of the present disclosure is performed using a calibration index located at a portion of a ship.

Specifically, the present disclosure is directed to an imaging system for a ship. The system includes a plurality of cameras mounted on the ship and located at a predetermined interval, and a controller configured or programmed to combine peripheral images of the ship captured by the cameras to create a composite image.

In an imaging system for a ship according to a preferred embodiment of the present disclosure, adjacent ones of the cameras are located at positions and angles so that the peripheral images captured by the cameras include a portion of the ship in common, and the controller performs calibration process to adjust areas of the peripheral images to be used for the composite image, based on a calibration index located at the portion of the ship and included in common in the peripheral images. The "calibration index located at the portion of the ship" described herein includes a calibration index located independently of a component of the ship, or a calibration index that is a portion of the ship itself.

According to this configuration, the portion of the ship is captured in common by the adjacent ones of the cameras, and the calibration process is performed to adjust the areas of the peripheral images of the ship to be used for a composite image, using the calibration index located at the portion of the ship and captured in common. That is, the calibration process can be performed by utilizing the portion of the ship, without requiring an additional facility to place the calibration index besides the ship. Accordingly, the calibration process can be performed, wherever the ship is.

Preferably, in an imaging system for a ship according to a preferred embodiment of the present invention, the controller converts the peripheral images of the ship captured by the respective cameras into an image as if the ship were viewed down from above, based on a distance from the position of each of the cameras to a waterline of the ship and the angle at which each of the cameras is located, and then combines the peripheral images within the areas adjusted by the calibration process to create the composite image.

Each of the cameras located in the ship faces obliquely downward toward a periphery of the ship. The periphery of the ship is captured not from right above, but obliquely downward from above. In this manner, the peripheral images of the ship captured obliquely from above by the respective cameras are converted into an image as if the ship were viewed down from above, based on the distance from the position of each of the cameras to the waterline of the ship and the angle at which each of the cameras is located. This allows creation of a highly integral simulated bird's eye image as the composite image.

Preferred embodiments of the present invention are advantageous in creating the composite image, since the peripheral images of the ship are combined in the areas adjusted by the calibration process.

Each of the cameras may face an outer periphery of the ship. Preferably, in this case, the controller may perform the calibration process based on the calibration index located on the outer periphery of ship.

According to this configuration, each camera is disposed so that the calibration index is located as close to the center as possible of the associated peripheral image. This configuration reduces or prevents negative effects of distortions (e.g., wide-angle distortions) of the lenses of the cameras on the calibration process, and improves the accuracy of the calibration process.

In an imaging system for a ship according to a preferred embodiment of the present invention, the capturing ranges of the adjacent ones of the cameras partially overlap with each other around the ship. The controller may connect the peripheral images of the ship to create the composite image so that common capturing ranges captured by the adjacent ones of the cameras do not appear to be overlapping in the composite image. In this case, the controller may determine the areas of the peripheral images of the ship to be used for the composite image so that the common capturing ranges captured by the adjacent ones of the cameras do not appear to be overlapping in the composite image.

Preferred embodiments of the present invention also provide ships each including an imaging system that captures the periphery of the ship according to one of the above-described preferred embodiments of the present invention.

Preferred embodiments of the present invention also provide calibrating methods for an imaging system for a ship to adjust areas of peripheral images of a ship to be used for a composite image. An imaging system for a ship according to a preferred embodiment of the present invention captures the peripheral images using a plurality of cameras located at a predetermined interval in the ship and combines the peripheral images captured by the respective cameras to create the composite image.

A calibrating method for the imaging system for a ship according to a preferred embodiment of the present disclosure includes capturing the peripheral images using adjacent ones of the cameras so that the peripheral images include a portion of the ship in common, and performing calibration to adjust areas of the peripheral images of the ship to be used for the composite image, based on a calibration index located at a portion of the ship and included in common in the peripheral images captured in the capturing.

According to this configuration, the portion of the ship is captured in common by the adjacent ones of the cameras, and the calibration process is performed to adjust the peripheral images of the ship to be used for a composite image, using a calibration index located at the portion of the ship and captured in common. That is, the calibration process can be performed by utilizing the portion of the ship, without requiring an additional facility for placing the calibration index besides the ship. Accordingly, the calibration process can be performed wherever the ship is.

According to an imaging system for a ship according to a preferred embodiment of the present invention, a ship including the imaging system for a ship, and a calibrating method for the imaging system for a ship according to a preferred embodiment of the present invention, the calibration process to adjust areas of peripheral images of the ship to be used for a composite image can be carried out wherever the ship is. As a result, the usability of the imaging system for a ship improves.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will now be described in detail with reference to the drawings.

In the present preferred embodiment, an imaging system for a ship and a calibrating method for the imaging system for a ship according to the present disclosure will be described using, as an example, a surrounding confirmation system mounted on a ship. The ship surrounding confirmation system is used to confirm the periphery of the ship by using images during a steering operation, such as berthing, of the ship.

Figure 1:
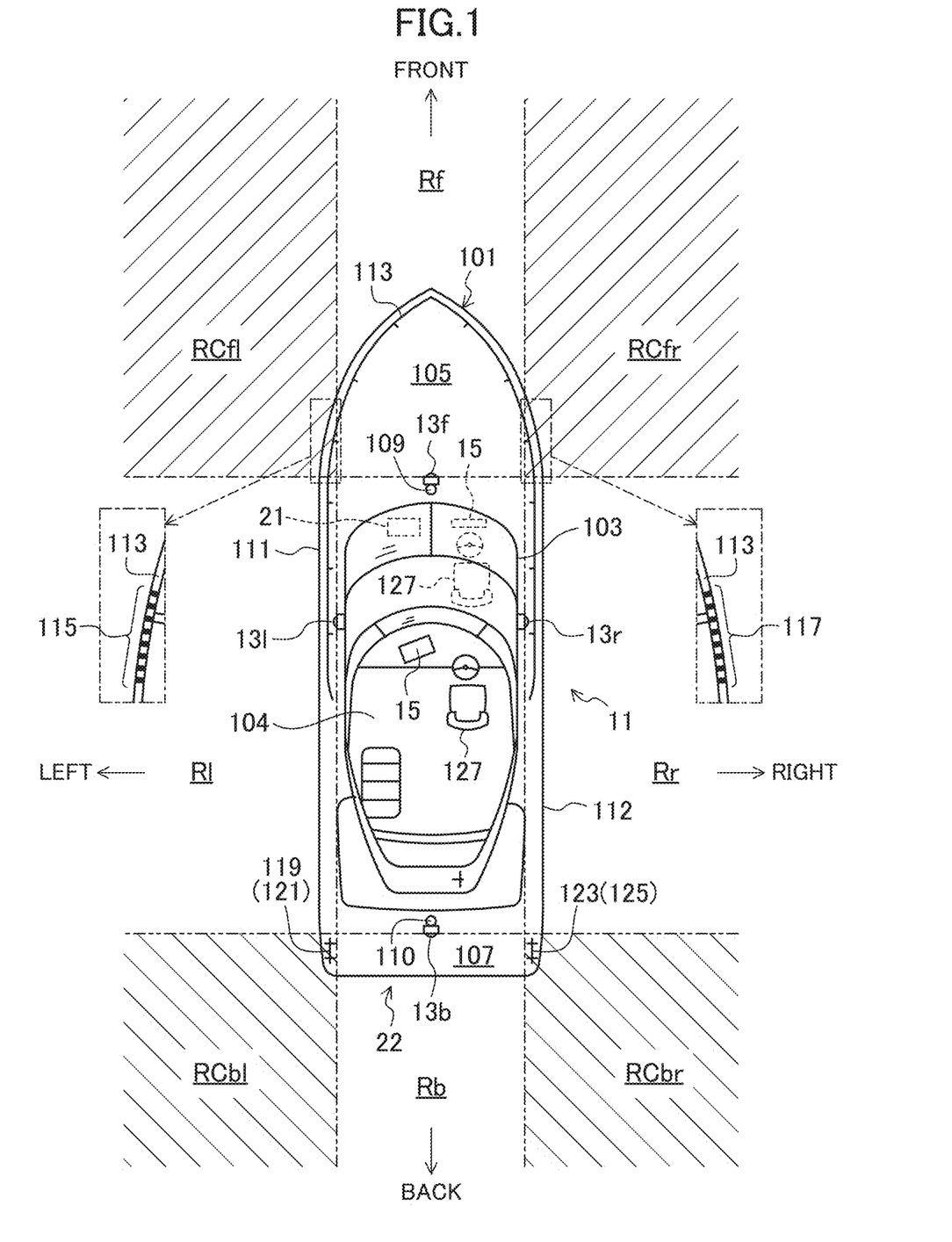
FIG. 1 is a plan view of a ship equipped with a surrounding confirmation system according to a preferred embodiment of the present invention.
Figure 2:
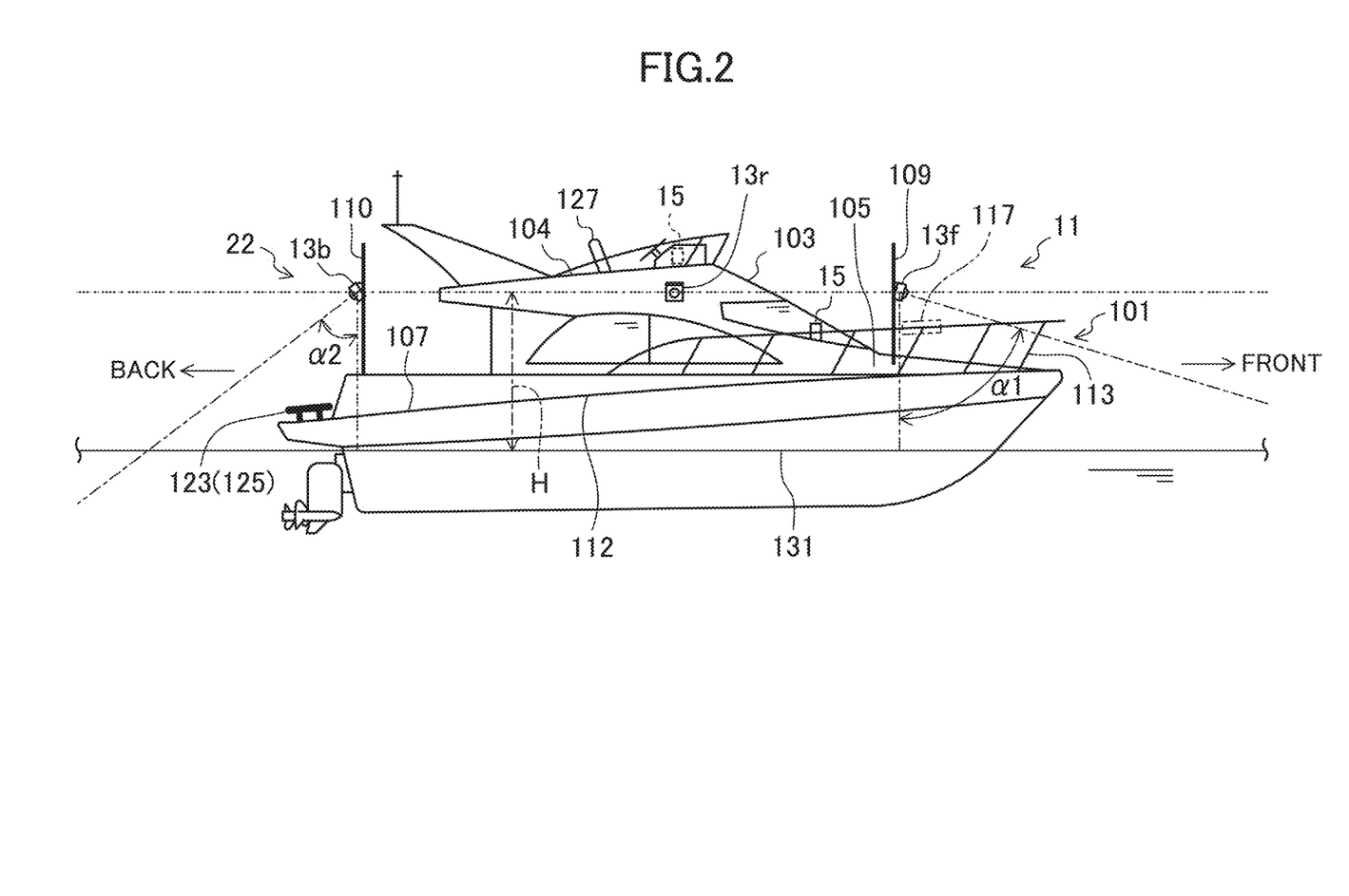
FIG. 2 is a side view of a ship equipped with a surrounding confirmation system according to a preferred embodiment of the present invention.
Figure 3:
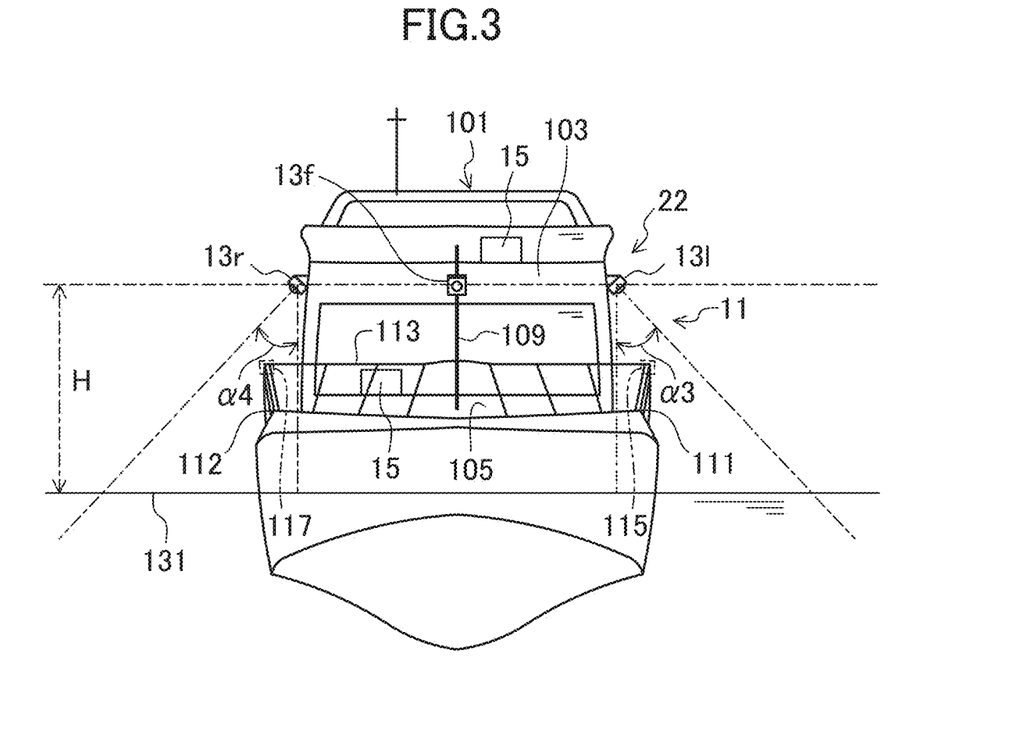
FIG. 3 is a front view of the ship equipped with a surrounding confirmation system according to a preferred embodiment of the present invention.
Figure 4:
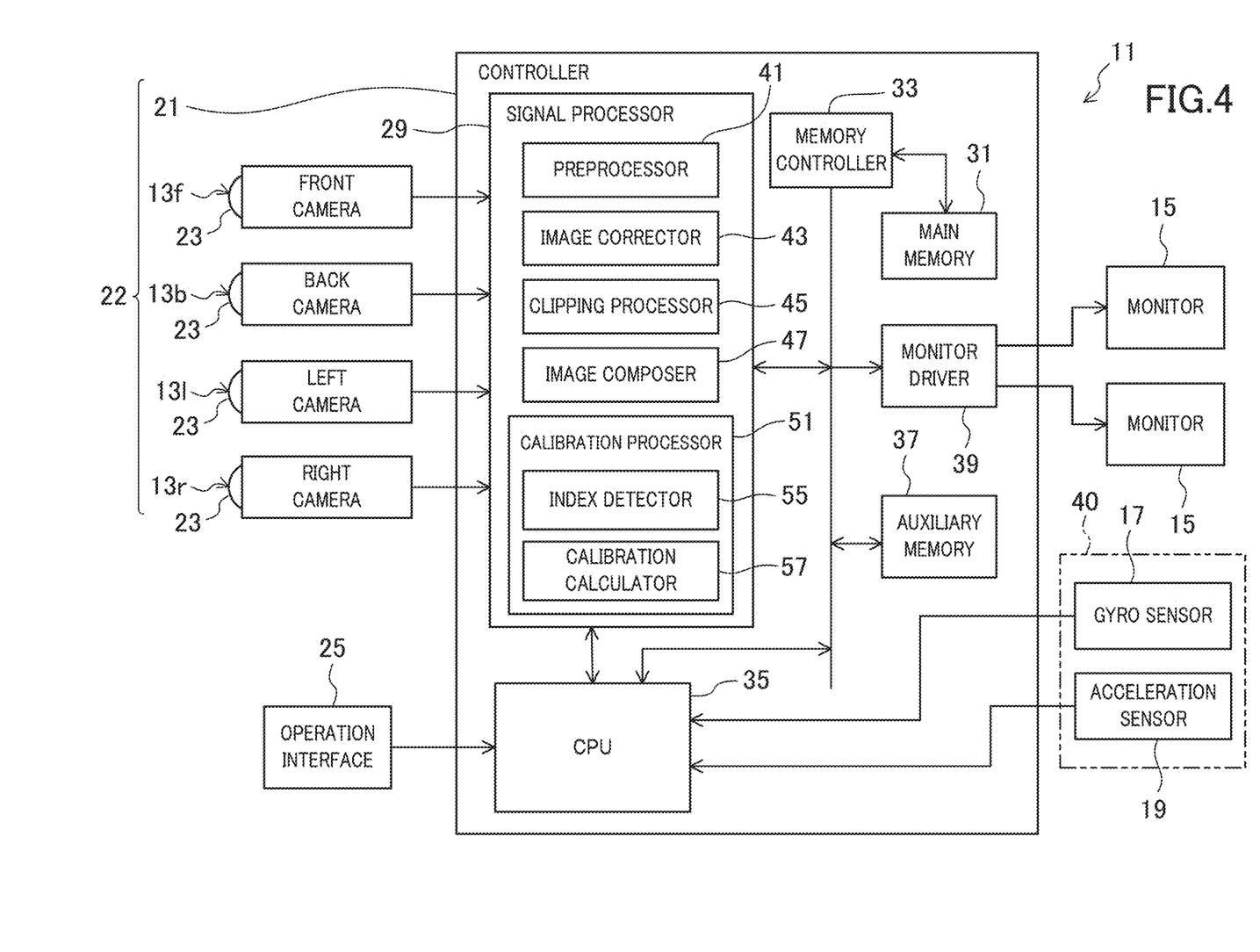
FIG. 4 is a block diagram illustrating a configuration of a surrounding confirmation system according to a preferred embodiment of the present invention.

A configuration of the ship surrounding confirmation system will be described with reference to FIGS. 1 to 4. FIG. 1 is a plan view of a ship 101 equipped with a surrounding confirmation system 11. FIG. 2 is a side view of the ship 101 equipped with the surrounding confirmation system 11. FIG. 3 is a front view of the ship 101 equipped with the surrounding confirmation system 11. FIG. 4 is a block diagram illustrating a configuration of the surrounding confirmation system 11 of the ship 101. FIG. 1 does not show exact postures of a plurality of cameras 13$f$, 13$b$, 13$l$, and 13$r$ included in the surrounding confirmation system 11.

As shown in FIGS. 1 to 4, the surrounding confirmation system 11 of the ship 101 includes the plurality of cameras 13$f$, 13$b$, 13$l$, and 13$r$, monitors 15 as display devices, various sensors 17 and 19, and a controller 21. The cameras 13$f$, 13$b$, 13$l$, and 13$r$ are located in the ship 101 at predetermined intervals. One of the monitors 15 is located in a cabin 103 and the other on a flying deck (flying bridge) 104. The sensors 17 and 19 detect the posture of the ship 101. The controller 21 is comprehensively controls the system 11. The plurality of cameras 13$f$, 13$b$, 13$l$, and 13$r$ and the controller 21 define an imaging system 22 to capture the periphery of the ship 101 to create a simulated bird's eye image that is a composite image.

The cameras 13$f$, 13$b$, 13$l$ and 13$r$ are as follows. The camera 13$f$ is a front camera located on a bow deck 105 at the bow. The camera 13$b$ is a back camera located on a stern deck 107 at the stern. The camera 13$l$ is a left camera located on the left at the longitudinal center of the ship 101. The camera 13$r$ is a right camera located on the right at the center of the ship. These four cameras 13$f$, 13$b$, 13$l$ and 13$r$ are located to capture images of the periphery, including the outer periphery, of the ship 101.

The front camera 13$f$ is attached to a post 109 standing at the lateral center of the bow deck 105 to face forward and obliquely downward so that the optical axis of the lens is directed toward the bow (the outer periphery of the ship 101). The front camera 13$f$ captures still or moving images of the view within a predetermined range Rf in front of the ship 101 and obtains a front image Pf as a peripheral image.

The back camera 13b is attached to a post 110 standing at the lateral center of the stern deck 107 to face backward and obliquely downward so that the optical axis of the lens is directed toward the stern of the ship 101 (the outer periphery of the ship 101). The back camera 13b captures still or moving images of the view within a predetermined range Rb behind the ship 101 and obtains a back image Pb as a peripheral image.

The left camera 13l is attached on the left side surface of the cabin 103 to face leftward and obliquely downward so that the optical axis of the lens is directed toward a left gunwale 111 (the outer periphery of the ship 101). The left camera 13l captures still or moving images of the view within a predetermined range Rl on the left of the ship 101 and obtains a left image Pl as a peripheral image.

The right camera 13r is attached on the right side surface of the cabin 103 to face rightward and obliquely downward so that the optical axis of the lens is directed toward a right gunwale 112 (the outer periphery of the ship 101). The right camera 13r captures still or moving images of the view within a predetermined range Rr on the right of the ship 101 and obtains a right image Pr as a peripheral image.

The capturing range Rf of the front camera 13f and the capturing range Rl of the left camera 13l include a common overlapping capturing range RCfl (the shaded area on the upper left of the sheet of FIG. 1). The front camera 13f and the left camera 13l are located at the positions and angles so that the peripheral images Pf and Pl captured by the cameras 13f and 13l include, in common, the left portion of a handrail 113 located on the outer periphery of the bow deck 105 of the ship 101. Accordingly, the common capturing range RCfl of the front camera 13f and the left camera 13l is set to a range which includes the left portion of the handrail 113.

A portion of the handrail 113 included in common in the peripheral images Pf and Pl captured by the front camera 13f and the left camera 13l is denoted in white and black stripes by winding a tape or applying a coat. The stripes define and function as a first calibration index 115. The first calibration index 115 is used in calibration process, which will be described later, to adjust the areas, to be used for a bird's eye image 301, of the peripheral images Pf and Pl captured by the front camera 13f and the left camera 13l.

The capturing range Rf of the front camera 13f and the capturing range Rr of the right camera 13r include a common overlapping capturing range RCfr (the shaded area on the upper right of the sheet of FIG. 1). The front camera 13f and the right camera 13r are located at the positions and angles so that the peripheral images Pf and Pr captured by the cameras 13f and 13r include, in common, the right portion of the handrail 113 located on the outer periphery of the bow deck 105 of the ship 101. Accordingly, the common capturing range RCfr of the front camera 13f and the right camera 13r is set to a range which includes the right portion of the handrail 113.

A portion of the handrail 113 included in common in the peripheral images Pf and Pr captured by the front camera 13f and the right camera 13r is denoted in white and black stripes by winding a tape or applying a coat. The stripes define and function as a second calibration index 117. The second calibration index 117 is used in the calibration process, which will be described later, to adjust the areas, to be used for the bird's eye image 301, of the peripheral images Pf and Pr captured by the front camera 13f and the right camera 13r.

The capturing range Rb of the back camera 13b and the capturing range Rl of the left camera 13l include a common overlapping capturing range RCbl (the shaded area on the lower left of the sheet of FIG. 1). The back camera 13b and the left camera 13l are located at the positions and angles so that the peripheral images Pb and Pl captured by the cameras 13b and 13l include, in common, a cleat 119 located on the left of the stern deck 107 of the ship 101. Accordingly, the common capturing range RCbl of the back camera 13b and the left camera 13l is set to be a range which includes the cleat 119 used to moor the left side of the ship 101.

The surface of the cleat 119 included in common in the peripheral images Pb and Pl captured by the back camera 13b and the left camera 13l is colored in black by, for example, applying a coat if the hull is white, and defines and functions as a third calibration index 121. The third calibration index 121 is used in the calibration process, which will be described later, to adjust the areas, to be used for the bird's eye image 301, of the peripheral images Pb and Pl captured by the back camera 13b and the left camera 13l.

The capturing range Rb of the back camera 13b and the capturing range Rr of the right camera 13r include a common overlapping capturing range RCbr (the shaded area on the lower right of the sheet of FIG. 1). The back camera 13b and the right camera 13r are located at the positions and angles so that the peripheral images Pb and Pr captured by the cameras 13b and 13r include, in common, a cleat 123 located on the right of the stern deck 107 of the ship 101. Accordingly, the common capturing range RCbr of the back camera 13b and the right camera 13r is set to be a range which includes the cleat 123 used to moor the right side of the ship 101.

The surface of the cleat 123 included in common in the peripheral images Pb and Pr captured by the back camera 13b and the right camera 13r is colored in black by, for example, applying a coat if the hull is white, and defines and functions as a fourth calibration index 125. The fourth calibration index 125 is used in the calibration process, which will be described later, to adjust the areas, to be used for the bird's eye image 301, of the peripheral images Pb and Pr captured by the back camera 13b and the right camera 13r.

In this preferred embodiment, the front camera 13f, the back camera 13b, the left camera 13l, and the right camera 13r are positioned at a same height H from the water surface. The height H is a distance from a waterline 131 of the ship 101 to the position of each camera. The placement angle $\alpha 1$ of the front camera 13f, the placement angle $\alpha 2$ of the back camera 13b, and the placement angles $\alpha 3$ and $\alpha 4$ of the left and right cameras 13l and 13r, respectively, differ from one another. The placement angle $\alpha 3$ of the left camera 13l and the placement angle $\alpha 4$ of the right camera 13r are the same angle.

The placement angle of each camera 13f, 13b, 13l, or 13r may be any angle. That is, the placement angle $\alpha 1$ of the front camera 13f, the placement angle $\alpha 2$ of the back camera 13b, and the placement angles $\alpha 3$ and $\alpha 4$ of the left and right cameras 13l and 13r, respectively, may be the same angle. The placement angles $\alpha 3$ and $\alpha 4$ of the left camera 13l and the right camera 13r may be different from each other.

The front camera 13f, the back camera 13b, the left camera 13l, and the right camera 13r are waterproof and dustproof. The cameras 13f, 13b, 13l and 13r are detachably attached to the ship 101. For example, the cameras may be attached to the hull while the ship 101 is used and detached after the use of the ship 101, and may be replaceable if any problem occurs.

The front camera 13f, the back camera 13b, the left camera 13l, and the right camera 13r are wide-angle cameras each having a wide-angle lens 23 with a wider angle of view than a standard lens. The wide-angle lens 23 may be, for example, a lens with an angle of view of 180 degrees or greater. Specifically, the front camera 13f, the back camera 13b, the left camera 13l, and the right camera 13r in this preferred embodiment are wide-area cameras each including the wide-angle lens 23, that is, what is called hemispheric cameras.

Figure 5:
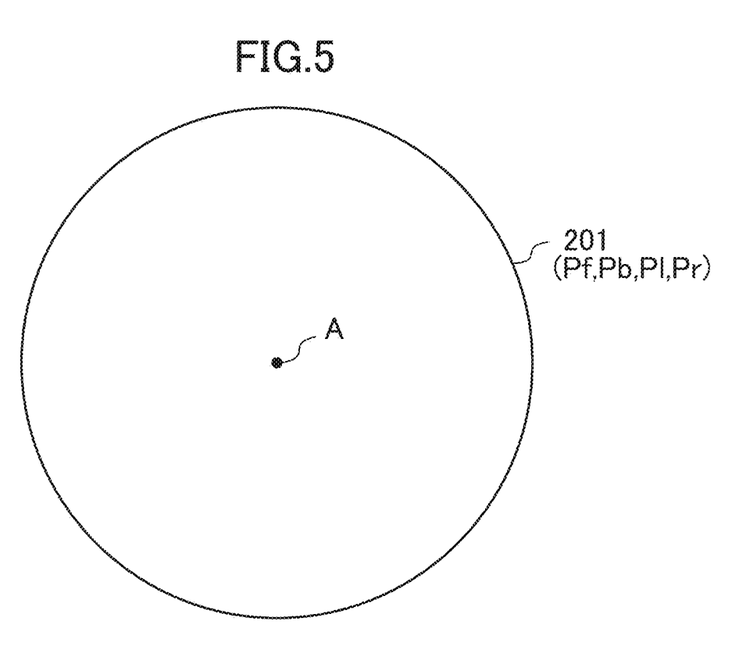
FIG. 5 is a schematic diagram of an image captured by a hemispheric camera.

FIG. 5 is a conceptual diagram of an image 201 captured by a hemispheric camera. As shown in FIG. 5, each of the front image Pf captured by the front camera 13f, the back image Pb captured by the back camera 13b, the left image Pl captured by the left camera 13l, and the right image Pr captured by the right camera 13r is the circular image 201 with a view of 360 degrees around the optical axis A of the wide-angle lens 23. This circular image 201 corresponds to an image obtained by converting, through projection, the stereoscopic optical image projected onto the outer surface of the wide-angle lens 23 into a planar image along the optical axis A.

The front image Pf, the back image Pb, the left image Pl, and the right image Pr, each of which is a circular image like the circular image 201, include a wide-angle distortion. The "wide-angle distortion" as used herein is a distortion of a stereoscopic optical image which is deformed so as not to be similar to the field, but to be shrunk with a curve, on the outer peripheral side when the image is projected on a plane. This wide-angle distortion is one of aberrations of a lens known as a barrel distortion of the wide-angle lens 23 except a fish eye lens. The degree of the distortion increases in accordance with a distance from the center of an image and is particularly significant around the image.

One of the monitors 15 is disposed in front of a steering seat 127 in the cabin 103 and the other around a steering seat 127 on the flying deck (flying bridge) 104, to be seen by a ship operator seated on the steering seat 127 while steering the ship. Each monitor 15 displays the simulated bird's eye image of the ship 101 as if the ship were viewed down from above. The simulated bird's eye image is created based on the front image Pf, the back image Pb, the left image Pl, and the right image Pr obtained by the front camera 13f, the back camera 13b, the left camera 13l, and the right camera 13r.

Figure 6:
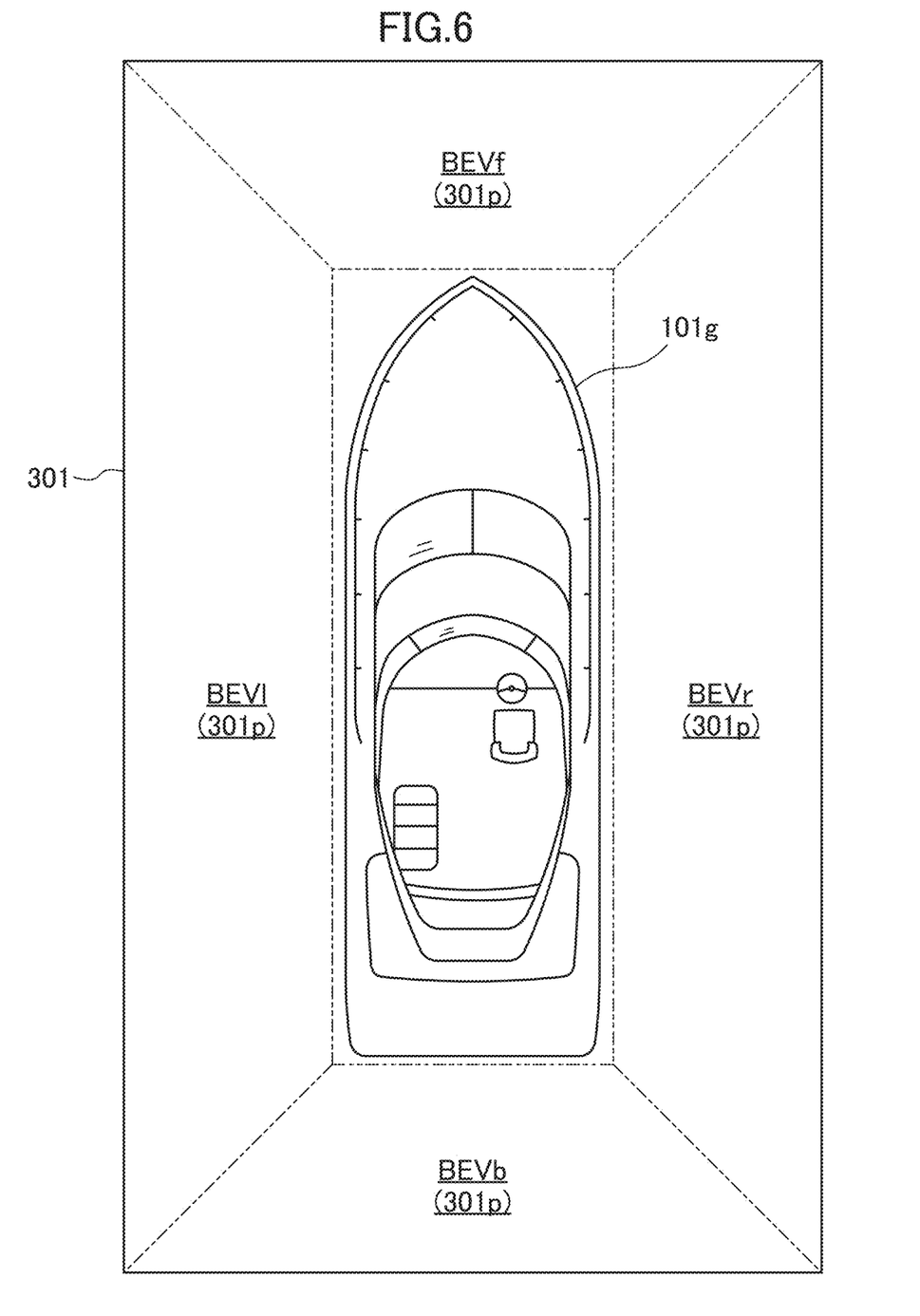
FIG. 6 is a schematic diagram of a bird's eye image displayed by monitors of a surrounding confirmation system according to a preferred embodiment of the present invention.

FIG. 6 is a schematic diagram of the bird's eye image 301 displayed on the monitors 15. As shown in FIG. 6, the bird's eye image 301 is a composite image obtained by combining four partial bird's eye images 301p, namely, a front bird's eye image BEVf, a back bird's eye image BEVb, a left bird's eye image BEVl, and a right bird's eye image BEVr. For example, the bird's eye image 301 is integrated by seamlessly connecting the four partial bird's eye images 301p in the common capturing ranges RCfl, RCfr, RCbl and RCbr, or is displayed by aligning the four partial bird's eye images 301p as separate data. In this bird's eye image 301, a ship image 101g representing the upper surface of the ship 101 is shown at the center. The ship image 101g may be an illustration or a photograph, for example.

Each monitor 15 may be, for example, a liquid crystal display panel defining and functioning as a touch panel. Each monitor 15 also defines and functions as an operation interface 25. The operation interface 25 sends an instruction on display setting, such as changing the ranges of the bird's eye image 301 to be displayed or displaying the individual peripheral images (i.e., the front image Pf, the back image Pb, the left image Pl, or the right image Pr) instead of the bird's eye image 301. The operation interface 25 also sends an instruction on execution of the calibration process of an imaging system 22, which will be described later. Each monitor 15 also displays a menu screen used to execute the calibration process or other processing. The user of the imaging system 22 such as a ship operator executes the calibration process by operating the operation interface 25 in accordance with the menu screen.

The various sensors 17 and 19 may include a gyro sensor 17 and an acceleration sensor 19. The gyro sensor 17 and the acceleration sensor 19 define a tilt sensor 40 that detects the tilts of the front camera 13f, the back camera 13b, the left camera 13l, and the right camera 13r changing in accordance with the shaking of the ship 101.

The gyro sensor 17 detects how fast the front camera 13f, the back camera 13b, the left camera 13l, and the right camera 13r rotate when the ship 101 tilts. The acceleration sensor 19 detects in which directions the front camera 13f, the back camera 13b, the left camera 13l, and the right camera 13r rotate when the ship 101 tilts.

The gyro sensor 17 and the acceleration sensor 19 are built in at least one of the front camera 13f, the back camera 13b, the left camera 13l, the right camera 13r, and the controller 21, for example. The gyro sensor 17 and the acceleration sensor 19 may be located on the ship 101 independently of the cameras 13f, 13b, 13l, and 13r and the controller 21.

The controller 21 is a controller using a known microcomputer as a main component. This controller 21 is located in the cabin 103, for example, and distributes and supplies power, which is received from a battery of the ship 101, to the front camera 13f, the back camera 13b, the left camera 13l, the right camera 13r, the monitors 15, and so on. The controller 21 exchanges data with the cameras 13f, 13b, 13l, and 13r, the monitors 15, and the various sensors 17 and 19.

Specifically, as shown in FIG. 4, the controller 21 is configured or programmed to include a signal processor 29, a main memory 31, a memory controller 33, a central processor (CPU) 35, an auxiliary memory 37, and a monitor driver 39. The signal processor 29 performs predetermined processing of image data. The main memory 31 temporarily stores programs and data. The memory controller 33 controls writing and reading of the programs and data to and from the main memory 31. The CPU 35 executes the programs read out of the main memory 31. The auxiliary memory 37 stores various programs and data. The monitor driver 39 operates the monitors 15.

The signal processor 29 and the CPU 35 may be typically comprised of integrated circuits (ICs), large-scale integrated circuits (LSICs), or application specific integration circuits (ASICs), for example. The main memory 31 may be typically comprised of a volatile memory such as a dynamic random-access memory (DRAM) or a synchronous DRAM (SDRAM). The auxiliary memory 37 may be typically comprised of a non-volatile memory such as a flash memory.

The signal processor 29 sequentially obtains the image data on the frames of the front image Pf, the back image Pb, the left image Pl, and the right image Pr output from the front camera 13f, the back camera 13b, the left camera 13l, and the right camera 13r, respectively. The signal processor 29 creates four partial bird's eye images 301p based on the obtained image data on the peripheral images Pf, Pb, Pl and Pr and combines the four partial bird's eye images 301p (i.e., BEVf, BEVb, BEVl, and BEVr) to compose and create the single bird's eye image 301.

The auxiliary memory 37 stores external parameters and internal parameters of the front camera 13f, the back camera 13b, the left camera 13l, and the right camera 13r. The "external parameters" used herein are numerical values indicating the state of placement of the cameras, such as the placement positions and angles of the cameras. The "internal parameters" are numerical values indicating the optical characteristics specific to the cameras, such as information on the positions of the optical axes, the focal lengths, and the distortions such as wide-angle distortions of the cameras.

The auxiliary memory 37 also stores setting values (initial values if the calibration process is not yet carried out) for the areas of the front image Pf, the back image Pb, the left image Pl, and the right image Pr to be clipped and used for the bird's eye image 301, and the position information of the calibration indexes 115, 117, 121, and 125 used for the calibration process.

The partial image of the area of the front image Pf to be clipped and used for the bird's eye image 301 defines the front bird's eye image BEVf out of the bird's eye image 301. The area of the front image Pf to be clipped and used for the bird's eye image 301, that is, the area of the front bird's eye image BEVf, is determined based on the first and second calibration indexes 115 and 117 so that the areas of the front image Pf, the left image Pl, and the right image Pr which overlap with one another do not appear in the bird's eye image 301, and that no area is lost between the front bird's eye image BEVf and the right and left bird's eye images BEVr and BEVl.

The partial image of the area of the back image Pb to be clipped and used for the bird's eye image 301 defines the back bird's eye image BEVb out of the bird's eye image 301. The area of the back image Pb to be clipped and used for the bird's eye image 301, that is, the area of the back bird's eye image BEVb, is determined based on the third and fourth calibration indexes 121 and 125 so that the areas of the back image Pb, the left image Pl, and the right image Pr which overlap with one another do not appear in the bird's eye image 301, and that no area is lost between the back bird's eye image BEVb and the right and left bird's eye images BEVr and BEVl.

The partial image of the area of the left image Pl to be clipped and used for the bird's eye image 301 defines the left bird's eye image BEVl out of the bird's eye image 301. The area of the left image Pl to be clipped and used for the bird's eye image 301, that is, the area of the left bird's eye image BEVl, is determined based on the first and third calibration indexes 115 and 121 so that the areas of the left image Pl, the front image Pf, and the back image Pb which overlap with one another do not appear in the bird's eye image 301, and that no area is lost between the left bird's eye image BEVl and the front and back bird's eye images BEVf and BEVb.

The partial image of the area of the right image Pr to be clipped and used for the bird's eye image 301 defines the right bird's eye image BEVr out of the bird's eye image 301. The area of the right image Pr to be clipped and used for the bird's eye image 301, that is, the area of the right bird's eye image BEVr, is determined based on the second and fourth calibration indexes 117 and 125 so that the areas of the right image Pr, the front image Pf, and the back image Pb which overlap with one another do not appear in the bird's eye image 301, and that no area is lost between the right bird's eye image BEVr and the front and back bird's eye images BEVf and BEVb.

The signal processor 29 may be configured or programmed to include a preprocessor 41, an image corrector 43, a clipping processor 45, and an image composer 47. The preprocessor 41, the image corrector 43, the clipping processor 45, and the image composer 47 are functional elements achieved by cooperation between hardware, such as a microcomputer, and software, such as programs to be executed on the hardware.

The memory controller 33 reads out the image data on the front image Pf, the back image Pb, the left image Pl, and the right image Pr from the main memory 31 when performing predetermined processing on the image data at the preprocessor 41, the image corrector 43, the clipping processor 45, and the image composer 47. After performing the predetermined processing on the image data on the front image Pf, the back image Pb, the left image Pl, and the right image Pr, the memory controller 33 writes the image data into the main memory 31.

The preprocessor 41 performs, as preprocessing, adjustment processing, such as digital clamping, pixel defect correction, and gain control, on the image data on the front image Pf, the back image Pb, the left image Pl, and the right image Pr captured by the front camera 13f, the back camera 13b, the left camera 13l, and the right camera 13r, respectively.

The image corrector 43 reads out the internal and external parameters of the front camera 13f, the back camera 13b, the left camera 13l, and the right camera 13r stored in the auxiliary memory 37 through the memory controller 33 to the main memory 31.

The image corrector 43 then performs distortion correction to convert the image data on the front image Pf into an image free from distortions, such as a wide-angle distortion, based on the internal parameters of the front camera 13f. The image corrector 43 performs the same or similar distortion correction of the image data on the back image Pb based on the internal parameters of the back camera 13b. The image corrector 43 performs the same or similar distortion correction of the image data on the left image Pl based on the internal parameters of the left camera 13l. The image corrector 43 performs the same or similar distortion correction of the image data on the right image Pr based on the internal parameters of the right camera 13r.

In addition, the image corrector 43 performs viewpoint conversion processing on the image data on the front image Pf to convert the image into an image as if the ship were viewed down from above, based on the internal and external parameters of the front camera 13f. The image corrector 43 performs the same or similar viewpoint conversion processing on the image data on the back image Pb, based on the internal and external parameters of the back camera 13b. The image corrector 43 performs the same or similar viewpoint conversion processing on the image data on the left image Pl, based on the internal and external parameters of the left camera 13l. The image corrector 43 performs the same or similar viewpoint conversion processing on the image data on the right image Pr, based on the internal and external parameters of the right camera 13r.

The clipping processor 45 reads out setting values stored in the auxiliary memory 37 through the memory controller 33 to the main memory 31. The setting values are regarding the areas of the front image Pf, the back image Pb, the left image Pl, and the right image Pr to be clipped and used for the bird's eye image 301.

The clipping processor 45 partially clips the image data on the front image Pf, the back image Pb, the left image Pl, and the right image Pr after the distortion correction and viewpoint conversion processing described above, in accordance with the setting values for the areas of the peripheral images Pf, Pb, Pl and Pr to be clipped. Accordingly, the clipping processor 45 creates the partial bird's eye image data on the front bird's eye image BEVf, the back bird's eye image BEVb, the left bird's eye image BEVl, and the right bird's eye image BEVr.

When performing the clipping processing of such image data, the signal processor 29 corrects the tilts of the image data on the front image Pf, the back image Pb, the left image Pl, and the right image Pr, and the clipping positions of the bird's eye images 301p (i.e., the front bird's eye image BEVf, the back bird's eye image BEVb, the left bird's eye image BEVl, and the right bird's eye image BEVr) based on the tilts of the front camera 13f, the back camera 13b, the left camera 13l, and the right camera 13r detected by the tilt sensor 40. Such correction is called "electronic gimbaling," which is a technique of canceling the displacement of a captured image in the rotation direction caused by a dynamic change in the posture of a camera.

The partial bird's eye images 301p are tilted with a change in the orientations of the cameras 13f, 13b, 13l, 13r caused by the shaking of the hull due to waves. Such tilts of the partial bird's eye images 301p seem larger with a greater distance of the bird's eye images 301p from the hull, since the viewpoint conversion processing described above is performed.

In contrast, in the present preferred embodiment, as described above, since the electronic gimbaling is performed to create the bird's eye image 301, the tilts of the bird's eye images 301p are corrected in accordance with the degrees of tilts of the front camera 13f, the back camera 13b, the left camera 13l, and the right camera 13r according to the posture of the ship 101, even when the ship 101 shakes and tilts. This reduces the tilts of the partial bird's eye images 301p caused by the shaking of the hull due to waves. This is advantageous in reducing the shaking of the bird's eye image 301 when the image 301 is displayed in real time. The partial bird's eye image data created in this manner is written into the main memory 31 by the memory controller 33.

The image composer 47 allows the memory controller 33 to read out, frame by frame, the partial bird's eye image data on the four images, that is, the front bird's eye image BEVf, the back bird's eye image BEVb, the left bird's eye image BEVl, and the right bird's eye image BEVr written in the main memory 31. The image composer 47 then combines the read-out partial bird's eye images and adjusts the image data on the ship image 101g to be positioned at the center of the image, thus creating the bird's eye image data on the bird's eye image 301. The bird's eye image data created in this manner is written into the main memory 31 by the memory controller 33.

The bird's eye image data of each frame written in the main memory 31 is read by the memory controller 33 upon receipt of an instruction from the CPU 35, and transferred to the monitor driver 39. The monitor driver 39 drives the monitors 15 based on the bird's eye image data read out of the main memory 31. Accordingly, the monitors 15 display, as a real-time image (i.e., a live view), the bird's eye image 301 based on the bird's eye image data.

The controller 21 performs what is called calibration process of the imaging system 22 to adjust the areas of the front image Pf, the back image Pb, the left image Pl, and the right image Pr to be used for the bird's eye image 301, that is, the areas of the image data to be clipped.

The controller 21 is configured or programmed to include a calibration processor 51 that performs such calibration process as described above. Once the ship operator operates the operation interface to execute calibration process, the calibration processor 51 allows the monitors 15 to display a screen requiring the user (e.g., the ship operator) to input information. The information includes the height H from the water surface, which is the distance from the placement positions of the cameras 13f, 13b, 13l, and 13r to the waterline 131 of the ship 101, the angles $\alpha 1$, $\alpha 2$, $\alpha 3$, and $\alpha 4$ at which the cameras 13f, 13b, 13l, and 13r are positioned respectively, and the positions of the first to fourth calibration indexes 115, 117, 121, and 125. At this time, the input height H and angles $\alpha 1$, $\alpha 2$, $\alpha 3$, and $\alpha 4$ of the cameras 13f, 13b, 13l, and 13r are written into the main memory 31 by the memory controller 33.

The calibration processor 51 includes an index detector 55 and a calibration calculator 57. The index detector 55 detects the first to fourth calibration indexes 115, 117, 121, and 125. The calibration calculator 57 performs calculation for the calibration process based on the first to fourth calibration indexes 115, 117, 121, and 125 detected by the index detector 55.

The index detector 55 detects the feature of the first calibration index 115 in the front image Pf and the left image Pl. The index detector 55 also detects the feature of the second calibration index 117 in the front image Pf and the right image Pr. The features of the first calibration index 115 and the second calibration index 117 are, for example, partial straight lines of the boundaries between the white and black stripes. The pattern of such partial straight lines may be detected by a known edge or straight line detection algorithm.

The index detector 55 also detects the feature of the third calibration index 121 in the back image Pb and the left image Pl. The index detector 55 also detects the feature of the fourth calibration index 125 in the back image Pb and the right image Pr. The features of the third calibration index 121 and the fourth calibration index 125 are, for example, partial straight lines of the boundaries between the white color of the hull and the black colors of the cleats 119 and 123, or the intersections between the partial straight lines. The pattern of such partial straight lines or intersections may be detected by a known edge or straight line detection algorithm.

The feature of the first calibration index 115 detected in the front image Pf indicates the coordinate (position) of the first calibration index 115 in the front image Pf. The feature of the second calibration index 117 detected in the front image Pf indicates the coordinate (position) of the second calibration index 117 in the front image Pf. The feature of the third calibration index 121 detected in the back image Pb indicates the coordinate (position) of the third calibration index 121 in the back image Pb. The feature of the fourth calibration index 125 detected in the back image Pb indicates the coordinate (position) of the fourth calibration index 125 in the back image Pb.

The feature of the first calibration index 115 detected in the left image Pl indicates the coordinate (position) of the first calibration index 115 in the left image Pl. The feature of the third calibration index 121 detected in the left image Pl indicates the coordinate (position) of the third calibration index 121 in the left image Pl. The feature of the second calibration index 117 detected in the right image Pr indicates the coordinate (position) of the second calibration index 117 in the right image Pr. The feature of the fourth calibration index 125 detected in the right image Pr indicates the coordinate (position) of the fourth calibration index 125 in the right image Pr.

Based on the coordinates of the first and second calibration indexes 115 and 117 in the front image Pf, the calibration calculator 57 adjusts the area of the front image Pf to be clipped so that the first and second calibration indexes 115 and 117 are located at predetermined positions in the clipped area. In addition, based on the coordinates of the third and fourth calibration indexes 121 and 125 in the back image Pb, the calibration calculator 57 adjusts the area of the back image Pb to be clipped so that the third and fourth calibration indexes 121 and 125 are located at predetermined positions in the clipped area.

Based on the coordinates of the first and third calibration indexes 115 and 121 in the left image Pl, the calibration calculator 57 adjusts the area of the left image Pl to be clipped so that the first and third calibration indexes 115 and 121 are located at predetermined positions in the clipped area. In addition, based on the coordinates of the second and fourth calibration indexes 117 and 125 in the right image Pr, the calibration calculator 57 adjusts the area of the right image Pr to be clipped so that the second and fourth calibration indexes 117 and 125 are located at predetermined positions in the clipped area.

In this manner, the setting values for the areas of the front image Pf, the back image Pb, the left image Pl, and the right image Pr to be clipped are adjusted. Accordingly, in creating the bird's eye image 301, the areas of the front image Pf, the back image Pb, the left image Pl, and the right image Pr to be clipped are determined so as not to cause any overlap or loss between the front and left bird's eye images BEVf and BEVl, between the front and right bird's eye images BEVf and BEVr, between the back and left bird's eye images BEVb and BEVl, and between the back and right bird's eye images BEVb and BEVr.

The setting values for the areas, to be clipped and used for the bird's eye image 301, of the front image Pf, the back image Pb, the left image Pl, and the right image Pr stored in the auxiliary memory 37 are updated through the memory controller 33 every time when the setting values are adjusted.

In the imaging system 22 for a ship configured as described above, the calibrating method for adjusting the areas of the front image Pf, the back image Pb, the left image Pl, and the right image Pr to be clipped and used for the bird's eye image 301 includes capturing and calibrating. In the capturing, the front image Pf, the back image Pb, the left image Pl, and the right image Pr are captured. In the calibrating, the areas of the front image Pf, the back image Pb, the left image Pl, and the right image Pr to be clipped are adjusted based on the captured front, back, left, and right images Pf, Pb, Pl and Pr.

Specifically, in the calibrating method using the imaging system 22 for a ship, after the front camera 13f, the back camera 13b, the left camera 13l, and the right camera 13r have been located at the predetermined positions of the ship 101, the user operates the operation interface 25 to execute the calibration process. Once the information on the height H of the cameras 13f, 13b, 13l, and 13r from the water surface and the placement angles α1, α2, α3, and α4 of the cameras, and the information on the positions of the first to fourth calibration indexes 115, 117, 121, and 125 are input to the operation interface 25, the capturing of the periphery, including the outer periphery, of the ship 101 is performed using the cameras 13f, 13b, 13l, and 13r.

In the capturing, the front camera 13f and the left camera 13l capture the front image Pf and the left image Pl including, in common, the first calibration index 115 located on the left portion of the handrail 113 of the bow deck 105 of the ship 101. In the capturing, the front camera 13f and the right camera 13r capture the front image Pf and the right image Pr including, in common, the second calibration index 117 located on the right portion of the handrail 113 of the bow deck 105 of the ship 101.

In the capturing, the back camera 13b and the left camera 13l capture the back image Pb and the left image Pl including, in common, the third calibration index 121 located on the left of the stern deck 107 of the ship 101. In the capturing, the back camera 13b and the right camera 13r capture the back image Pb and the right image Pr including, in common, the fourth calibration index 125 located on the right of the stern deck 107 of the ship 101.

In the next calibrating, the area of the front image Pf to be clipped is adjusted based on the first and second calibration indexes 115 and 117 included in the front image Pf captured in the capturing. The first calibration index 115 is located on the left of the handrail 113, whereas the second calibration index 117 is located on the right of the handrail 113. In the calibrating, the area of the back image Pb to be clipped is adjusted based on the third and fourth calibration indexes 121 and 125 included in the back image Pb captured in the capturing. The third calibration index 121 is the cleat 119 on the left of the stern deck 107, whereas the fourth calibration index 125 is the cleat 123 on the right of the stern deck 107.

In the calibrating, the area of the left image Pl to be clipped is adjusted based on the first and third calibration indexes 115 and 121 included in the left image Pl captured in the capturing. The first calibration index 115 is located on the left of the handrail 113, whereas the third calibration index 121 is the cleat 119 on the left of the stern deck 107. In the calibrating, the area of the right image Pr to be clipped is adjusted based on the second and fourth calibration indexes 117 and 125 included in the right image Pr captured in the capturing. The second calibration index 117 is located on the right of the handrail 114, whereas the fourth calibration index 125 is the cleat 123 on the right of the stern deck 107.

In this manner, the imaging system 22 for a ship performs the calibration process to adjust the areas of the front image Pf, the back image Pb, the left image Pl, and the right image Pr to be clipped, using the first to fourth calibration indexes 115, 117, 123, and 125 located at the parts of the ship 101.

According to the imaging system 22 for a ship and the calibrating method for the system of this preferred embodiment, each pair of the front and left cameras 13f and 13l, the front and right cameras 13f and 13r, the back and left cameras 13b and 13l, and the back and right cameras 13b and 13r captures a portion of the ship 101 in common. The calibration process is performed to adjust the areas of the front image Pf, the back image Pb, the left image Pl, and the right image Pr to be clipped and used for the bird's eye image 301, using the first to fourth calibration indexes 115, 117, 121, and 125 located at the portions of the ship 101 and captured in common. That is, the calibration process can be performed by utilizing the portions of the ship 101, without requiring an additional facility to place the calibration indexes besides the ship 101. This allows the calibration process wherever the ship 101 is. As a result, the usability of the imaging system 22 for a ship improves.

Preferred embodiments of the present invention have been described above as examples of the present disclosure. The present disclosure is however not limited thereto and is applicable to preferred embodiments including changes, modifications, replacements, additions, and omissions made as appropriate. The components illustrated in the accompanying drawings and described in the detailed description may also include those not essential to achieve various advantages and benefits. Those non-essential components should not be immediately recognized as being essential based only on the fact that they are illustrated in the accompanying drawings and described in the detailed description.

For example, the preferred embodiments described above may also have the following configurations.

In the preferred embodiments described above, the imaging system 22 for a ship includes the four cameras, namely, the front camera 13f, the back camera 13b, the left camera 13l, and the right camera 13r. The present disclosure is not limited thereto. The number of cameras included in the imaging system 22 for a ship may be three or less or five or more. Any number of cameras may be used, as long as a composite image such as the bird's eye image 301 can be created.

In the preferred embodiments described above, the front camera 13f, the back camera 13b, the left camera 13l, and the right camera 13r are hemisphere cameras. The present disclosure is not limited thereto. The hemispheric cameras are mere examples of the cameras. Any types of cameras may be used, as long as the camera includes a wide-angle lens (the concept including a fish eye lens) with a wider angle of view than a standard lens, and is capable of capturing a relatively wide field of view.

In the preferred embodiments described above, the imaging system 22 for a ship creates the bird's eye image 301 as if the ship 101 were viewed down from above. The present disclosure is not limited thereto. The imaging system 22 for a ship may create, as a composite image, a panoramic image displaying the panoramic view around the ship 101. Any image may be created, as long as the image is a composite image obtained by combining the peripheral images of the ship 101 captured by a plurality of cameras, such as the front camera 13f, the back camera 13b, the left camera 13l, and the right camera 13r, located around the ship 101.

An example has been described in the above preferred embodiments in which the first and second calibration indexes 115 and 117 are the stripe patterns on the handrail 113, and the third and fourth calibration indexes 121 and 125 are the cleats in the color with a high contrast with respect to the hull. The present disclosure is not limited thereto. The first to fourth calibration indexes 115, 117, 121, and 125 may be checkered tiles with the pattern of white and black squares embedded in the deck of the ship 101 or may be the shapes of portions, such as the handrail 113 itself, of the ship 101. The calibration indexes may be independent from the ship 101 and attached to the handrail or located on the deck. Any index may be used, as long as its feature can be detected by image processing.

An example of the bird's eye image 301 created by the imaging system 22 for a ship has been described in the above preferred embodiments in which the front bird's eye image BEVf, the back bird's eye image BEVb, the left bird's eye image BEVl, and the right bird's eye image BEVr are combined so that the boundary lines are at an angle of about 45 degrees toward the sheet of FIG. 6. The present disclosure is not limited thereto. In the bird's eye image 301 created by the imaging system 22 for a ship, the boundary lines between adjacent partial bird's eye images 301p may be set to any position within the common ranges to be captured by the adjacent cameras.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An imaging system for a ship, the imaging system comprising:
    a plurality of cameras mounted on the ship and spaced apart at a predetermined interval; and
    a controller configured or programmed to combine peripheral images of the ship captured by the plurality of cameras to create a composite image; wherein
    the plurality of cameras are located above a hull of the ship;
    adjacent ones of the plurality of cameras are located at positions and angles so that the peripheral images captured by the plurality of cameras include a common portion of the ship;
    the controller is configured or programmed to perform a calibration process to adjust areas of the peripheral images to be used for the composite image based on a calibration index located at the common portion of the ship and included in the peripheral images; and
    the common portion of the ship is at least one of a handrail, a cleat, or a deck.

2. The imaging system of claim 1, wherein the controller is configured or programmed to convert the peripheral images of the ship captured by the plurality of cameras into an image as if the ship were viewed down from above based on a distance from the position of each of the plurality of cameras to a waterline of the ship and the angle at which each of the plurality of cameras is positioned, and to combine the peripheral images within the areas adjusted by the calibration process to create the composite image.

3. The imaging system of claim 1, wherein
    each of the plurality of cameras is positioned to face an outer periphery of the ship; and
    the controller is configured or programmed to perform the calibration process based on the calibration index located on the outer periphery of the ship.

4. The imaging system of claim 1, wherein
    capturing ranges of the adjacent ones of the plurality of cameras partially overlap with each other around the ship; and
    the controller is configured or programmed to connect the peripheral images to create the composite image so that common capturing ranges captured by the adjacent ones of the plurality of cameras do not appear to be overlapping in the composite image.

5. The imaging system of claim 4, wherein the controller is configured or programmed to determine the areas of the peripheral images to be used for the composite image so that the common capturing ranges captured by the adjacent ones of the plurality of cameras do not appear to be overlapping in the composite image.

6. The imaging system of claim 1, wherein the calibration index is a pattern of a color different from a color of the hull of the ship.

7. A ship comprising:
    the imaging system of claim 1.

8. A calibrating method for an imaging system for a ship that adjusts areas of peripheral images of a ship to be used for a composite image, the imaging system capturing the peripheral images using a plurality of cameras mounted on the ship and spaced apart at a predetermined interval and combining the peripheral images captured by the plurality of cameras to create the composite image, the method comprising:
    capturing the peripheral images using adjacent ones of the plurality of cameras so that the peripheral images include a common portion of the ship, the plurality of cameras being located above a hull of the ship; and performing calibration to adjust the areas of the peripheral images to be used for the composite image based on a calibration index located at the common portion of the ship and included in the peripheral images captured in the step of capturing; wherein the common portion of the ship is at least one of a handrail, a cleat, or a deck.

* * * * *

UNITED STATES PATENT AND TRADEMARK OFFICE
CERTIFICATE OF CORRECTION

| | |
|---|---|
| PATENT NO. | : 11,243,539 B2 |
| APPLICATION NO. | : 16/811064 |
| DATED | : February 8, 2022 |
| INVENTOR(S) | : Mitsuaki Kurokawa et al. |

It is certified that error appears in the above-identified patent and that said Letters Patent is hereby corrected as shown below:

On the Title Page

Item (73) Assignees, please list the following:
YAMAHA HATSUDOKI KABUSHIKI KAISHA, Shizuoka (JP)

Signed and Sealed this
Thirtieth Day of August, 2022

Katherine Kelly Vidal
*Director of the United States Patent and Trademark Office*